United States Patent [19]

Murgue et al.

[11] Patent Number: 4,964,723
[45] Date of Patent: Oct. 23, 1990

[54] PROCESS AND DEVICE FOR DETECTING THE COMING INTERPOSITION OF A MASK BETWEEN AN AIRCRAFT AND A TARGET, PARTICULARLY IN A LASER-GUIDED WEAPON FIRING SYSTEM

[75] Inventors: Jean Pierre Murgue, Orleans; Robert Pressiai, Ville d'Avray; Léon Robin, Massy, all of France

[73] Assignee: Thomson-CSF, Paris, France

[21] Appl. No.: 901,041

[22] Filed: Aug. 1, 1986

[30] Foreign Application Priority Data

Aug. 2, 1985 [FR] France ............................... 85 11885

[51] Int. Cl.$^5$ .......................... G01C 1/00; H04N 7/00; G06F 15/14
[52] U.S. Cl. .................................... 356/141; 356/152; 358/103; 364/423; 364/424.01; 364/444; 364/460; 382/1; 382/42
[58] Field of Search ...................... 358/103; 382/1, 40, 382/42, 22, 23, 25, 27; 364/423, 424, 444, 460, 424.01; 244/3.15–3.17

[56] References Cited

U.S. PATENT DOCUMENTS

| | | | |
|---|---|---|---|
| 4,121,246 | 10/1978 | Fadden et al. | 358/103 |
| 4,489,389 | 12/1984 | Beckwith et al. | 358/103 X |
| 4,997,065 | 1/1985 | Tisdale et al. | 382/1 |

Primary Examiner—Thomas H. Tarcza
Assistant Examiner—Linda J. Wallace

[57] ABSTRACT

This process for detecting the coming interposition of a mask between an aircraft (A) and a target (C), particularly in a laser-guided weapon firing system, wherein the aircraft has an automatic target tracking system providing an image of the terrain on which the target occupies a permanent fixed position, consists in detecting, during a turn carried out by the aircraft, the points M of this image, marked by their elevation $i_m - i_c$ with respect to the target C, situated in a zone such that $i_M - i_C < 0$ and having an angular progression velocity, with respect to the target, opposite to that of the other points in that zone at the same altitude as the target.

Application in particular to laser-guided weapon firing systems.

5 Claims, 6 Drawing Sheets

PROCESS AND DEVICE FOR DETECTING THE COMING INTERPOSITION OF A MASK BETWEEN AN AIRCRAFT AND A TARGET, PARTICULARLY IN A LASER-GUIDED WEAPON FIRING SYSTEM

BACKGROUND OF THE INVENTION (1) Field of the Invention

The present invention relates to a process and a device for the detection of a coming interposition of a mask between an aircraft and a target, particularly in a laser-guided weapon firing system.

(2) Description of the Prior Art

A laser-guided weapon firing system makes use of an aircraft carrying weapons fitted with homing heads sensitive to the reception of infra-red radiation. This aircraft is also fitted with an automatic target tracking system, in order to slave the aiming direction on the one hand and the direction of radiation of an infra-red transmitter located in the aircraft on the other hand, to the target direction. As this radiation is then reflected by the target, the homing head can, once the firing has been completed, slave its direction onto that of the target all the way along the path travelled by the weapons to the target.

The problem then arises of the possibility of an interposition of obstacles (such as hills, etc.), commonly called "masks", between the illuminating aircraft and the target, which would interrupt the reception of the infra-red radiation by the weapon's homing head, and because of this would prevent the system from functioning correctly.

SUMMARY OF THE INVENTION

The present invention enables the obtaining of automatic detection of immediate risks of interception of the aircraft-target line by masks in order to warn the pilot so that he can avoid them or in order to carry out an automatic avoidance by acting directly on the pilotage of the aircraft.

The present invention depends on the image (thermal camera or television) provided to the pilot by the target tracking system and makes use of the fact that the illuminating aircraft carries out a disengaging turn during the flight of the weapons.

The process according to the invention for the detection of a coming interposition of a mask between an aircraft and a target, particularly in a laser-guided weapon firing system, wherein the aircraft has an automatic target tracking system providing an image of the terrain on which the target occupies a permanent fixed position, consists in detecting, during a turn carried out by the aircraft, the points M of this image, marked by their elevation $i_M - i_C$ with respect to the target C, situated in a zone such that $i_M - i_C < 0$ and having an angular progression velocity with respect to the target, opposite to that of the other points in that zone at the same altitude as the target.

BRIEF DESCRIPTION OF THE DRAWINGS

Other purposes and characteristics of the present invention will appear more clearly on reading the following description of examples of embodiment given with reference to the appended drawings in which.

DESCRIPTION OF THE PREFERRED EMBODIMENT

Figure 1:
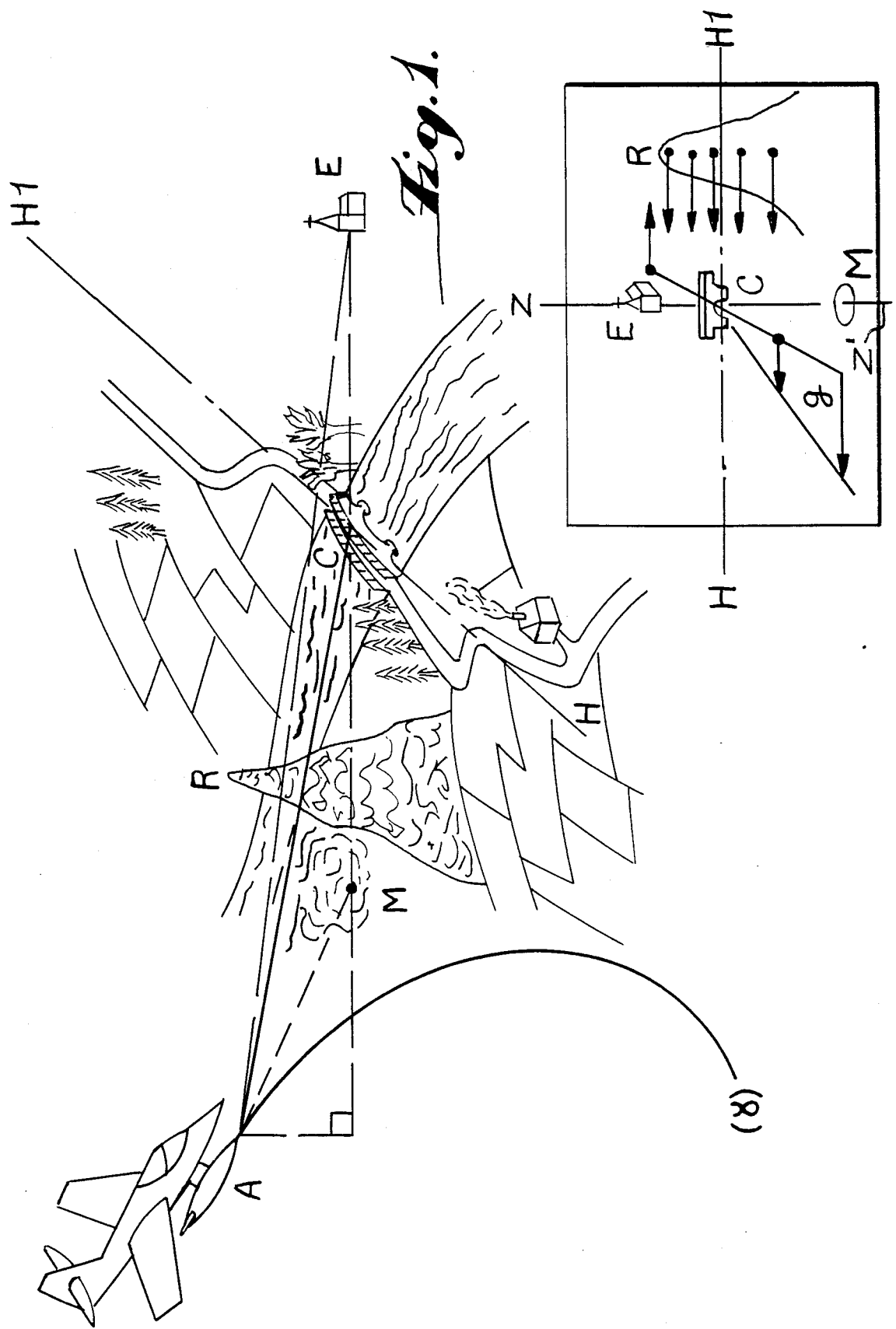
FIG. 1 is a diagram explaining the principle of the invention on a concrete example of application.

The principle of the invention appears in FIG. 1 which diagrammatically represents an aircraft A flying over a terrain in which appear in particular a bridge, which on this occasion constitutes the target C, and a hill which constitutes an immediate risk of interception of the aircraft-target line AC during the disengaging turn carried out by the aircraft and represented by the trajectory ($\gamma$). This figure also contains a diagrammatic representation of the image provided to the pilot by the target tracking system as well as the development of this image (represented by arrows) during the disengagement of the aircraft.

As automatic tracking is assured, the point C aimed at on the target appears stationary on the image. The most distant points (such as E: AE>AC) which progress more slowly in the absolute appear to progress to the right of the image (with the chosen example for the direction of disengagement of the aircraft) and conversely the closer points (such as M: AM<AC) appear to progress to the left of the image.

In addition, the objects and elements of the terrain situated at the same altitude as the target are lower than the line $H_C H_1$ on the image if they are closer to the aircraft than the target and vice-versa.

On the other hand, a sufficiently high element, like the hill, is partially above the line $H_C H_1$ on the image and, as it is closer to the aircraft than the target C (AR<AC), it seems to progress to the left and will effectively become interposed between the aircraft and the target.

On this image the axis ZZ' represents the vertical of the image, and the line $HH_1$ represents the perpendicular to the axis ZZ' passing through the point C.

All these properties are the subject of subsequent developments and demonstrations.

In conclusion, the elements of the terrain which will form a mask (within a few seconds) are characterized by a field of progression velocities opposite with respect to the field existing above the line $HH_1$ of the image (they go towards the vertical axis of the image), and they are partially above the line $HH_1$ of the image.

These are the properties that the invention proposes detecting and the portion or portions of terrain that are likely to become a mask or masks are indicated to the pilot.

Figure 2:
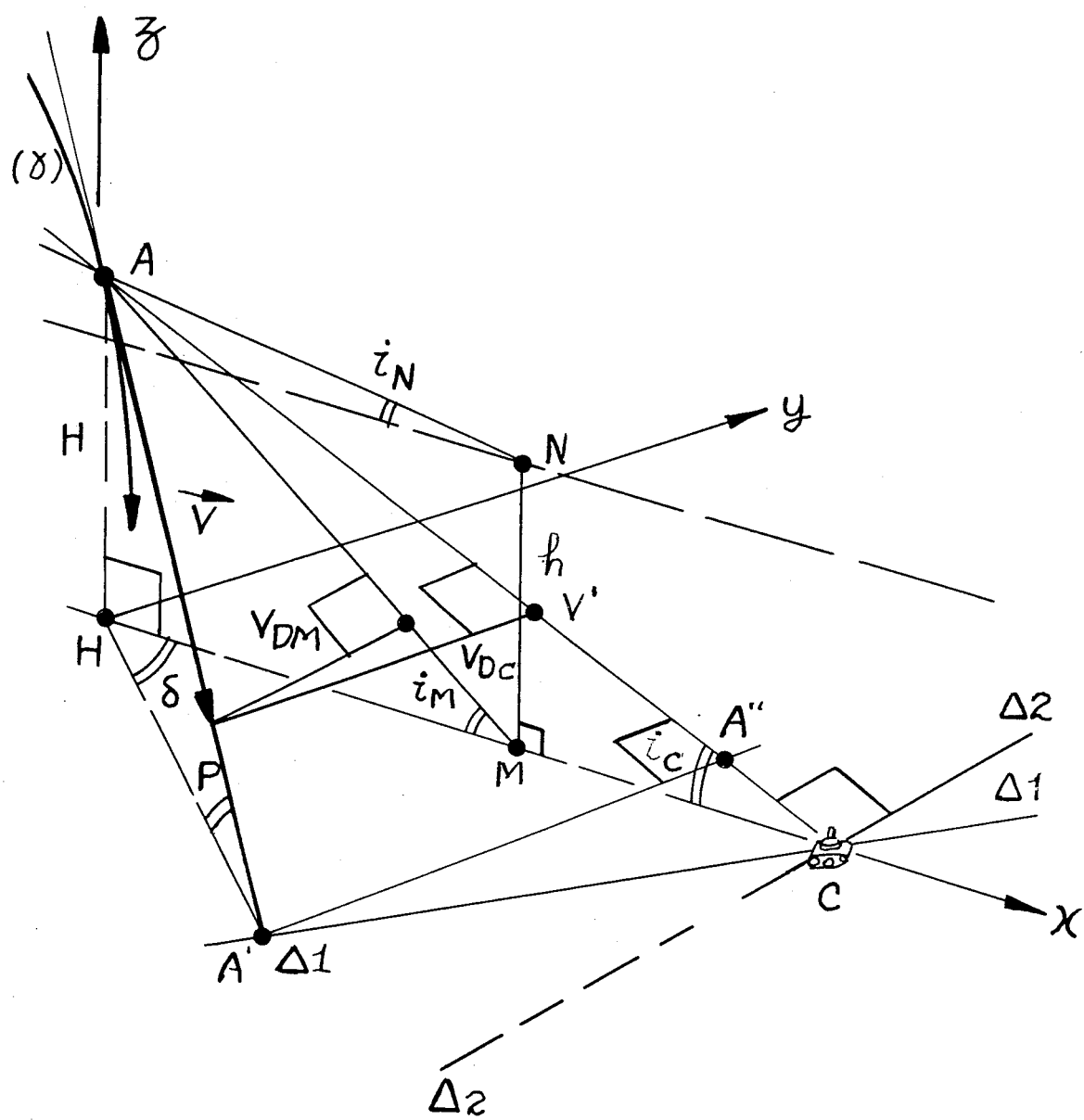
FIG. 2 is a diagram defining the various parameters used in the computations.

Reference is now made to FIG. 2 in order to compute the angular progression velocity of the various points in the image. The geographic axes ($H_x$, $H_y$, $H_z$) are considered.

The aircraft is at A, the target at C, the velocity vector $\vec{V}$ along the direction AA'. The angular progression velocity of the target is:

$$\Omega_c = \frac{V_{DC}}{D_C}$$

(where $D_C$ is the range from the aircraft to the target and $V_{DC}$ is the projection of $\vec{V}$ on the Aircraft-Target line AC). The computation of $V_{DC}$ comes down to the computation of A'A" since $V_{DC}=A'A'' \times V/H \sin p$ (where p represents the slope, i.e. the angle between the horizontal plane and the velocity vector $\vec{V}$). Therefore:

$$\Omega = A'A'' \times \frac{V}{HD} \sin p = A'A'' \times \frac{V \sin i \sin p}{H^2}$$

(where i represents the angle of elevation from point C, i.e. the angle formed by the direction AC and its projection on the horizontal plane of equation z=0).

Also: $A'A''^2 = d_1 2 + d_2 2$ where $d_1$ and $d_2$ are the distances from A' to 2 perpendicular planes whose intersection is AC. We shall take:

the plane xHz of equation y=0 which gives $$|d_1| = \frac{H}{tgp} \sin \delta$$

and the plane perpendicular to xHz containing AC and of equation $$x + \frac{z}{tgi} - \frac{H}{tgi} = 0.$$

The distance $d_2$ is therefore equal to:

$$|d_2| = \frac{\frac{H}{tgp} \cos \delta - \frac{H}{tgi}}{\left(1 + \frac{1}{tg^2 i}\right)^{1/2}}$$

since the point A' has the following coordinates in the considered reference:

$$\left(\frac{H}{tgp} \cos \delta, -\frac{H}{tgp} \sin \delta, 0\right).$$

Hence: $d^2 = d_1^2 + d_2^2 = \left(\frac{h}{tgp} \sin \delta\right)^2 +$ $$\left(\frac{H}{tgp} \cos \delta \sin i - H \cos i\right)^2$$

and:

$$\Omega \text{ def} = \tag{2}$$

$$\frac{V}{H} \sin i \sqrt{\sin \delta^2 \cos p^2 + (\cos \delta \sin i \cos p - \cos i \sin p)^2}$$

This is the absolute angular progression velocity of the target (or of any other point having the same z coordinate as the target).

For a point whose coordinates is h with respect to the target the same computation is valid but H-h replaces H and the following expression is obtained directly:

$$\Omega \text{ def}_{(h)} = \tag{3}$$

$$\frac{V}{H-h} \sin i \sqrt{\sin^2 \delta \cos^2 p + (\cos \delta \sin i_h \cos p - \cos i_h \sin p)^2}$$

As the angles i and p are small, it will generally be possible to ignore the second square between brackets in the radical. Therefore the expressions:

$$\Omega \text{ def} \simeq \frac{V}{H} \sin i \sin \delta \cos p \tag{2'}$$

and $$\Omega \text{ def}_{(h)} \simeq \frac{V}{H-h} \sin i \sin \delta \cos p \tag{3'}$$

will replace, for the discussion, the expressions (2) and (3). It can be seen therefore that, for a point M with the same z coordinate as the target, the angular progression velocity with respect to the target $\Delta\Omega(=\Omega\text{déf}_m - \Omega\text{déf}_C)$ is:

$$\Delta\Omega_{Mh=0} \simeq \frac{V}{H} \sin \delta \cos p (\sin i_M - \sin i_C) \tag{4}$$

and for a point N of coordinate h with respect to the target C:

$$\Delta\Omega_{Nh} \simeq \frac{V}{H} \sin \delta \cos p \left(\frac{\sin i_N}{1 - \frac{h}{H}} - \sin i_C\right) \tag{5}$$

Consequently, equation (4) shows that an element of terrain with the same z coordinate as the target appears to progress, in relation to the target (stationary in the image due to the automatic tracking), proportional to $$\sin i_M - \sin i_C = 2 \sin \frac{i_M - i_C}{2} \cos \frac{i_M + i_C}{2}$$

$$\simeq 2 \sin \frac{i_M - i_C}{2} \cos i_C$$

(as the angle $i_M$ is small) and therefore practically proportional to the angular difference $i_M - i_C$ in which it is seen and in the same direction as the disengagement (with the orientation of δ chosen in FIG. 2) if $i_M < i_C$, and in the opposite direction in the complementary case.

The formula (5) shows, on the other hand, that for an element of terrain for which $h \neq 0$, we can have $i_N < i_C$ (the point N appears "higher" than the target on the image) and at the same time have:

$$\frac{\sin i_N}{1 - \frac{h}{H}} - \sin i_C > 0,$$

and therefore a progression opposite from the elements of terrain in the area $i_M < i_C$.

For this it is sufficient to have $$\sin i_N > \frac{H-h}{H} \sin i_C.$$

-continued

Now, $\sin i_N = \dfrac{H - h}{D_N}$ and $\sin i_C = \dfrac{H}{D_C}$ therefore the previous condition becomes: $D_N < D_C$.

Consequently, any element of terrain at a shorter distance than that of the target and seen however "above" the target on the image, and therefore capable of masking the target, will appear to progress in the opposite direction with respect to the elements of terrain in this half-image.

In addition, if the formula (5) is applied to all the points of an element of terrain, all at the same distance (for example a tower), we have for all these points:

$$\frac{\sin i_N}{1 - \dfrac{h_N}{H}} = \frac{H - h_N/D_N}{1 - \dfrac{h_N}{H}} = \frac{H}{D_N} = \text{constant}$$

All these points therefore move with the same apparent progression velocity, no matter what $i_N$ may be, and some of these points (some lower levels of the tower) are in the "below" zone of the target on the image and will not form a mask, the rest being "above".

On the other hand, the condition for $\Omega$ def to be opposite to the disengagement direction is, according to formula (5), $\sin i_N > \dfrac{H - h}{H} \sin i_C$ which gives, since $\sin i_C = \dfrac{H}{D_C}$ and $$\sin i_N = \frac{H - h}{D_N}, D_N < D_C.$$

Figure 3C:
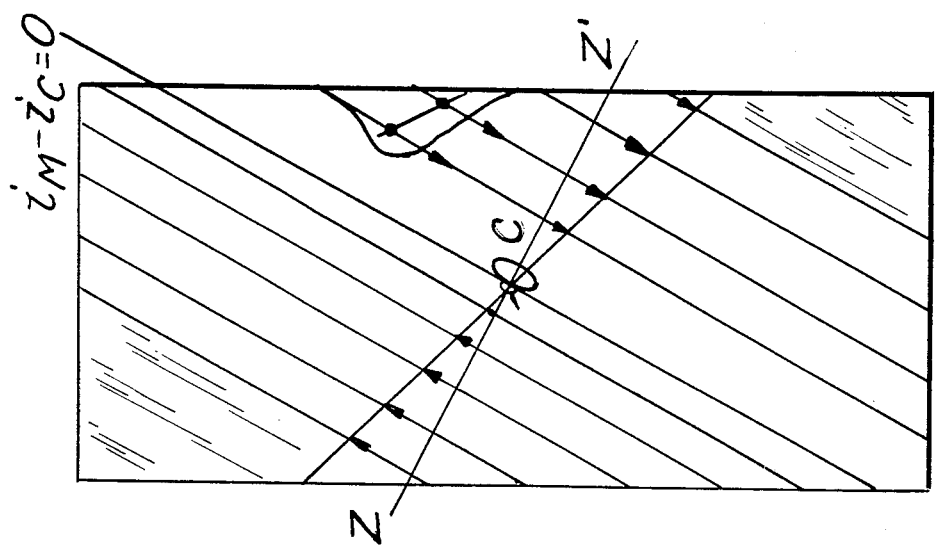
FIGS. 3a, 3b and 3c diagrammatically show examples of images obtained in the various possible cases.
Figure 3B:
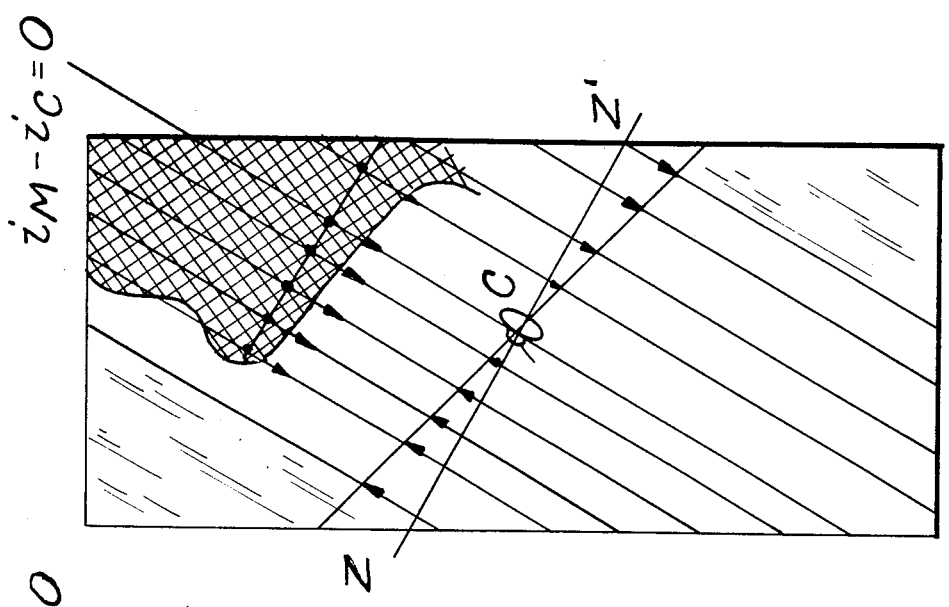
Figure 3A:
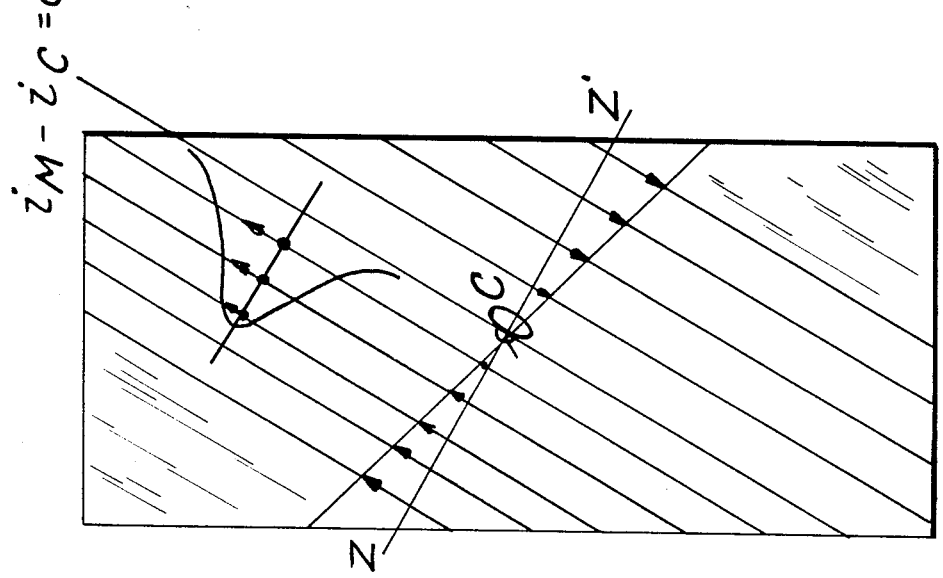

The following table summarizes all possible cases:

| $i_M$ | $i_M < i_C$ | | $i_M > i_C$ |
|---|---|---|---|
| | $\sin i_M < \dfrac{H-h}{H} \sin i_C$ | $\sin i_M > \dfrac{H-h}{H} \sin i_C$ | |
| ELEMENT M ON IMAGE | "above the target" | | "below" |
| ELEMENTS D  h = 0  $\Omega$ | > D TARGET  same direction as the disengagement | | < D TARGET  opposite direction |
| ELEMENTS D  h ≠ 0  $\Omega$ | > D TARGET  same direction | < D TARGET  opposite direction to disengagement | |
| MASK | NO | YES | NO |
| WHY | beyond the target | before the target and high enough | not high enough |
| IMAGE | FIG. 3a | FIG. 3b | FIG. 3c |

The necessary and sufficient condition for an element of terrain R to form a short-term mask which will interpose itself between the aircraft and the target is that the element is:

located on the image above the line $HH_1$ of apparent angular progression velocities of zero (with respect to the target), i.e. in a zone of points M defined by $i_M < i_C$ and moving with an apparent angular progression velocity (with respect to the target) opposite to that of the other elements of terrain in that zone, at the same altitude as the target.

The principle thus explained of the detection of coming interposition of a mask between an aircraft and a target can be implemented as follows:

a computation of the angular progression velocity $\Omega_{TM}$ with respect to the target of any point M of the image of elevation $i_M < i_C$ and assumed to be at the same altitude as the target, is firstly carried out using formula (4):

$$\Omega_{TM} = \frac{V}{H} \sin \delta \cos p \, (\sin i_M - \sin i_C);$$

a measurement of the actual angular velocity $\Omega_{RM}$ of progression of each of these points M with respect to the target is then carried out, for example by correlation of images in time;

a comparison between the angular velocities $\Omega_{TM}$ and $\Omega_{RM}$ thus obtained for any point is then carried out, a possible difference in sign between these two values signifying a coming interposition of a mask at the level of the points M considered. In order to attract the pilot's attention, it will be possible to reinforce these points on the display by the overlaying of a flashing contour (for example). Also, the masking delay $\tau_M$, corresponding with the edge of the mask closest to the center C of the image will be able to be computed by the quotient $$\tau_M = \left( \frac{g}{\Omega_R} \right)_M$$

where g represents the relative bearing, or coordinate along the $HH_1$ axis, of the considered edge of the mask) and shown on the display.

Figure 4:
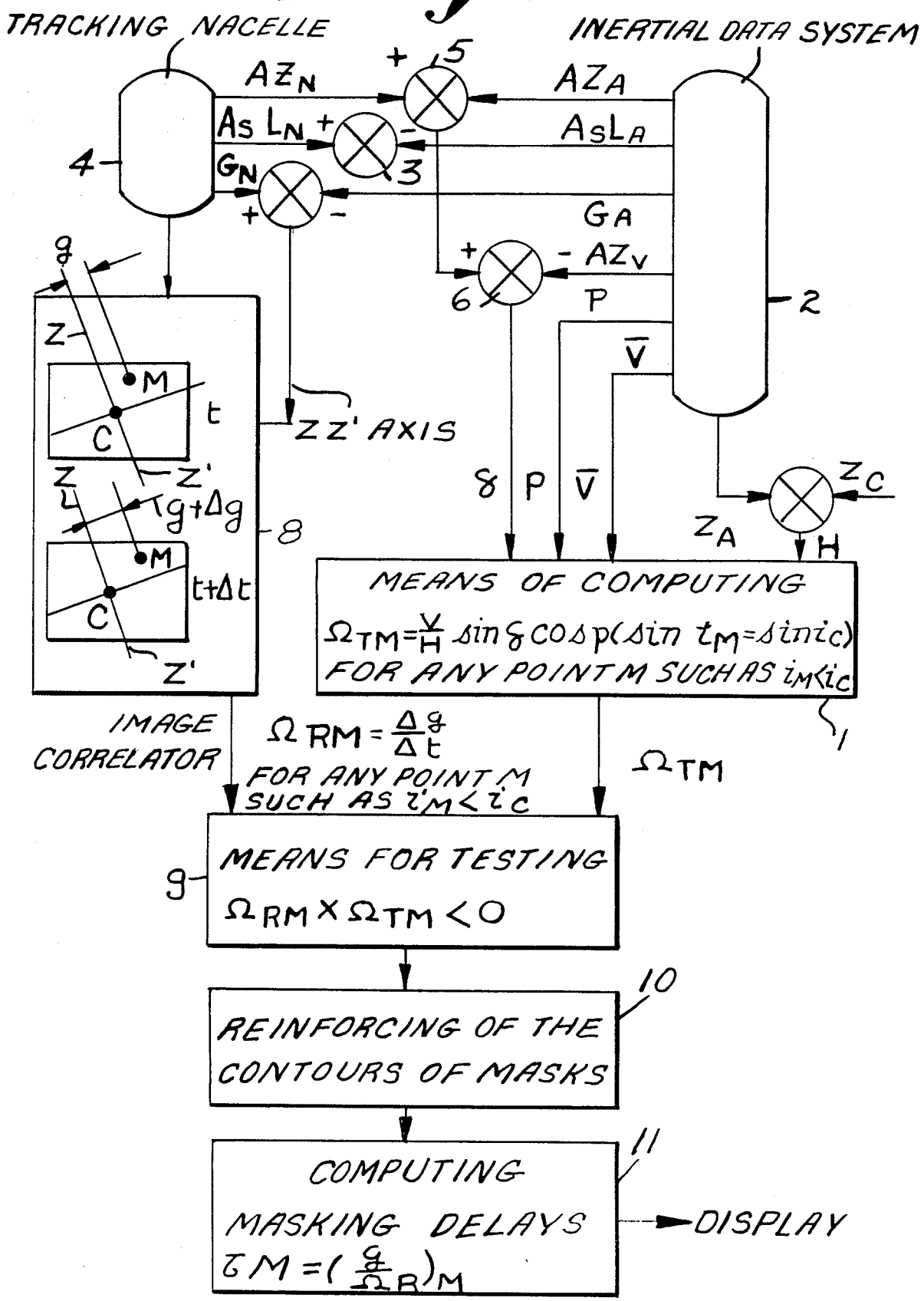
FIG. 4 is a block diagram of a device according to the invention.

A block diagram of a device for the implementation of this process is shown in FIG. 4. The computation of the angular velocities $\Omega_{TM}$ by formula (4):

$$\Omega_{TM} = \frac{V}{H} \sin \delta \cos p \, (\sin i_M - \sin i_C)$$

is carried out by the means of computation 1 for lines of equidistant points M perpendicular to the axis ZZ and each corresponding to one value of the angle of elevation $i_M$. The values of the slope p and the velocity V are provided by the inertial data system 2 of the aircraft.

The angle $i_C$, or angle between the direction AC (Aircraft-Target) and the horizontal plane is however obtained by deducting, by means of device 3, the pitch angle $AsL_A$ given by the inertial data system of the aircraft from the pitch angle $AsL_N$ given by the tracking nacelle 4 integral with the aircraft.

The angle $\delta$, or angle between the vertical planes passing through AC and through V is obtained by firstly deducting, by means of device 5, the azimuth angle $AZ_A$ given by the inertial data system of the aircraft to the azimuth angle $AZ_N$ given by the tracking nacelle, and then by deducting, by means of device 6, the azimuth $AZ_V$ of the velocity vector, provided by the inertial data system, from the azimuth thus obtained. Besides the value H is obtained by deducting the altitude of the target $Z_C$ from the altitude of the aircraft Z provided by the inertial data system.

The measurement of actual angular velocities $\Omega_{RM}$ is carried out by an image correlator 8 which receives on the one hand the images supplied by the tracking nacelle and on the other hand the direction of the axis ZZ', or the image vertical, obtained by deducting the bearing angle $G_A$ given by the inertial data system of the aircraft from the bearing angle $G_N$ given by the tracking nacelle. More precisely, the correlator 8 enables the computation of the offset $\Delta g$ of a point M of the image, in the direction perpendicular to the axis ZZ' (or bearing of set) between two times t and t+$\Delta$t. The angular velocity $\Omega_{RM}$ is then obtained by carrying out the computation $$\Omega_{RM} = \frac{\Delta g}{\Delta t}.$$

The product $\Omega_{RM} \times \Omega_{TM}$ is then carried out for every point M such that $i_M < i_C$, by the test means 9. If this product is negative, a device 10 for the reinforcing of the contours of masks on the image at the position of the points M considered, is activated, together with a device 11 for computing the masking delay $\tau_M$ according to the previously given formula, for display.

For each area of points M giving rise to a negative product $\Omega_{RM} \times \Omega_{TM}$, and therefore corresponding with a mask, the minimum of the $\tau_M$ values will be used.

The image correlator is not actually the subject of the invention and as it is well known in itself, particularly through French patent No. 1,504,656, it will not be described in detail.

Figure 5:
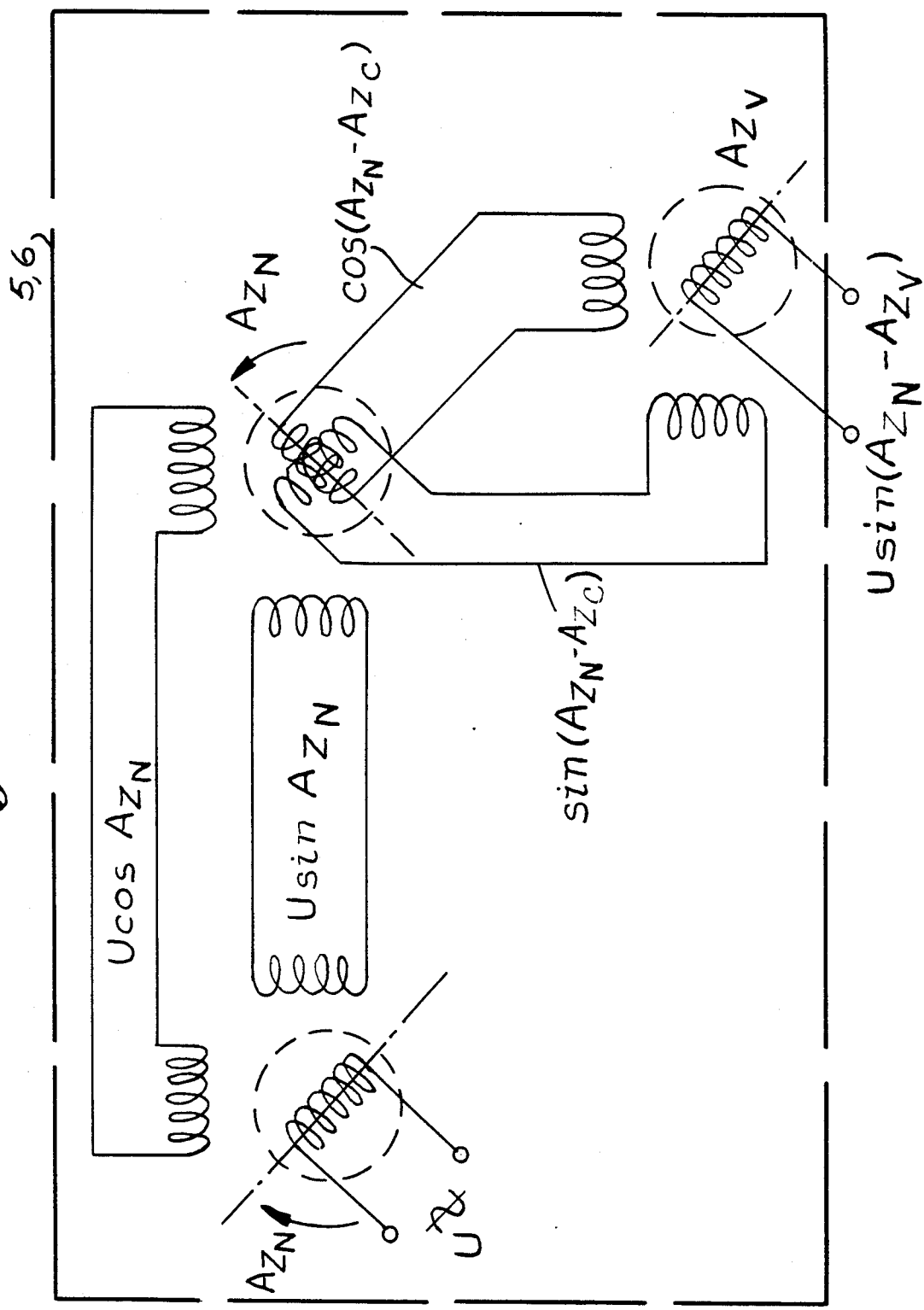
FIG. 5 shows an example of a circuit for computing the sine.

FIG. 5 shows an example of the means of computing sin $\delta$ (devices 5 and 6 in FIG. 4) from the values $AZ_N$ (azimuth of the aircraft given by the inertial data system), $AZ_N$ (azimuth from the tracking nacelle) and $AZ_V$ (azimuth of the velocity vector) using "resolvers".

Figure 6:
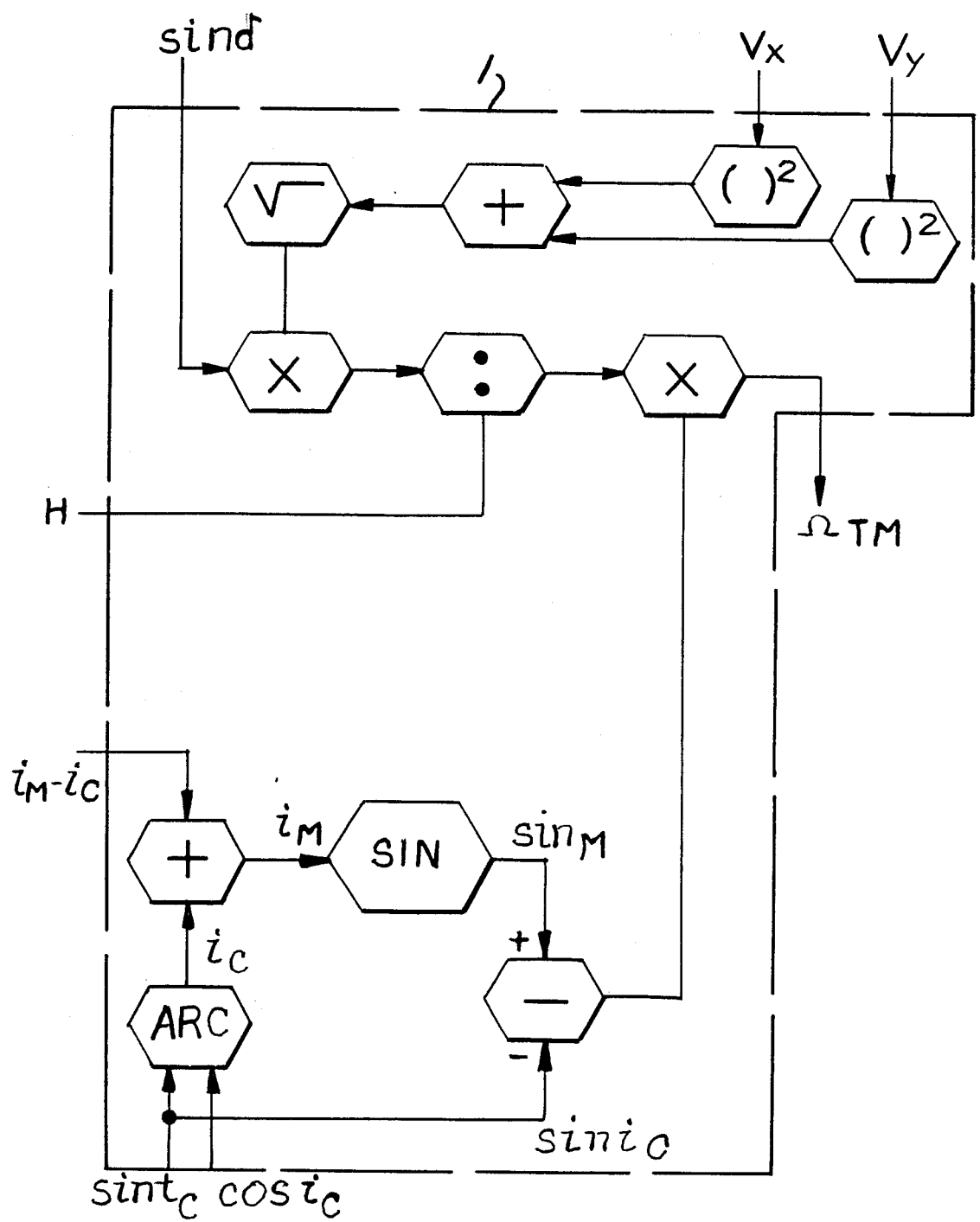
FIG. 6 shows a set of circuits for carrying out certain basic functions.

An example of embodiment of the means of computation 1 of the values $\Omega_{TM}$ is given in FIG. 6. This example is based on a writing of the formula:

$$\Omega_{TM} = \frac{V}{H} \sin \delta \cos p (\sin i_M - \sin i_C) \text{ in the form}$$

$$\Omega_{TM} = \frac{\sqrt{V_x^2 + V_y^2}}{H} \sin \delta (\sin i_M - \sin i_C) \quad (6)$$

where $V_x$, $V_y$ and $V_z$ are the components of the velocity vector of the aircraft in the geographic axes, taking account of the relationship:

$$\cos p = \frac{\sqrt{V_x^2 + V_y^2}}{V}.$$

The diagram in FIG. 6 also includes a set of circuits carrying out the basic functions: addition, subtraction, multiplication, division, squaring, extraction of square root, sine function and Arcsine or Arccosinue function. The circuits producing these functions are represented in FIG. 6 by their symbols: +, −, x, :, ( )$^2$, $\sqrt{}$, sin, Arc The angle $i_C$ is assumed to be determined, like the angle $\delta$ on FIG. 5, by the values sin $i_C$ and cos $i_C$. As the angle $i_M - i_C$ representing the elevation of a given point M with respect to the target is known from another source, the value sin $i_M$ is therefore obtained by computing $i_C$ from sin $i_C$ and cos $i_C$, and then $i_M$ from $i_M - i_C$ and $i_C$, and finally sin $i_M$ from $i_M$.

We claim:

1. Process for the detection of a coming interposition of a mask between an aircraft A and a target C, particularly in a laser-guided weapon firing system, wherein the aircraft has an automatic target tracking system providing an image of the terrain on which the target occupies a permanent fixed position, the process including detecting, during a turn carried out by the aircraft, various points M of this image, marked by an angle $i_M - i_C$, ($i_M$ and $i_C$ being the angular elevations of the aircraft respectively from a point M under consideration and from the target) formed between a line AM for angle $i_M$ and AC for $i_C$ where A is the aircraft and its projection on the horizontal plane situated in a zone such that $i_M - i_C < 0$ and having an angular progression velocity, with respect to the target, opposite to that of the other points in that zone, at the same altitude as the target, detecting being carried out as follows:

computing at every point M in a zone of the angular progression velocity $\Omega_{TM}$, with respect to the target, expected for the points at the same altitude as the target, using the expression $\Omega_{TM} = V/H \sin \delta \cos p(\sin i_M - \sin i_C)$ where V represents the velocity of the aircraft, H represents the height of the aircraft with respect to the target, $\delta$ represents the angle of azimuth between the aircraft-target direction and the velocity vector V of the aircraft, p represents the slope of the aircraft, or the angle between the velocity vector V of the aircraft and the horizontal plane, $i_M$ represents the angle of elevation of the point M concerned and $i_C$ represents the angle formed between the line AC and its projection on the horizontal plane;

measuring at all points M in said zone of the angular progression velocity, with respect to the target, actually obtained;

comparing at all points M in said zone of the two values thus obtained, a possible difference in sign signifying a coming interposition of a mask between the aircraft and the target at the level of the points M.

2. Process according to claim 1, wherein the contours of the sets of points M constituting coming masks between the aircraft and the target are emphasized on the image.

3. Process according to claim 1, wherein the delays of the coming interposition of masks between the aircraft and the target are computed and displayed on the image.

4. Device for the implementation of the process according to claim 1, including:

means of computing at any point M in the considered zone, the angular progression velocity, with respect to the target, expected for points at the same altitude as the target;

means of measuring, at any point M in the considered zone, the angular progression velocity with respect to the target, actually obtained;

means of comparison, for any point M in the considered zone, of the two values thus obtained, a possible difference in sign signifying a coming interposition of a mask between the aircraft and the target at the level of the considered point M.

5. Device according to claim 4, wherein the means of measuring consist of an image correlator (8).

* * * * *